United States Patent
Harita et al.

(10) Patent No.: US 7,178,985 B2
(45) Date of Patent: Feb. 20, 2007

(54) BEARING HOLDING STRUCTURE AND MOTOR HAVING SAME

(75) Inventors: Yasuhiro Harita, Kosai (JP); Toshihiro Sato, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 1072 days.

(21) Appl. No.: 09/788,428

(22) Filed: Feb. 21, 2001

(65) Prior Publication Data

US 2001/0017953 A1 Aug. 30, 2001

(30) Foreign Application Priority Data

Feb. 24, 2000 (JP) ............................. 2000-047862

(51) Int. Cl.
*F16C 23/04* (2006.01)
(52) U.S. Cl. ...................... 384/204; 384/192
(58) Field of Classification Search ............... 384/192, 384/202, 203, 204
See application file for complete search history.

(56) References Cited

U.S. PATENT DOCUMENTS

| | | | | |
|---|---|---|---|---|
| 2,938,755 A | * | 5/1960 | Lee et al. .................. 384/204 |
| 3,239,287 A | * | 3/1966 | Rose ......................... 384/203 |
| 3,483,888 A | * | 12/1969 | Wurzel ..................... 384/203 |
| 3,770,990 A | * | 11/1973 | Winkelmann ............... 384/204 |
| 4,161,055 A | * | 7/1979 | Weremijenko .............. 384/203 |
| 4,166,658 A | * | 9/1979 | Glass ........................ 384/203 |
| 4,806,025 A | * | 2/1989 | Kamiyama et al. ......... 384/202 |
| 4,887,916 A | * | 12/1989 | Adam et al. ................ 384/204 |
| 5,360,274 A | * | 11/1994 | Strobl ........................ 384/192 |
| 5,455,471 A | * | 10/1995 | Dowell ...................... 384/192 |
| RE35,855 E | * | 7/1998 | Blaettner et al. ........... 384/204 |
| 5,853,248 A | * | 12/1998 | Dalessandro ............... 384/192 |
| 6,012,849 A | * | 1/2000 | Takagi ....................... 384/192 |

FOREIGN PATENT DOCUMENTS

| | | |
|---|---|---|
| JP | 07-103229 | 4/1995 |
| JP | 11-089160 | 3/1999 |

* cited by examiner

*Primary Examiner*—Robert A. Siconolfi
(74) *Attorney, Agent, or Firm*—Posz Law Group, PLC

(57) ABSTRACT

In a bearing holding structure in which a bearing whose outer circumferential surface is formed in a spherical shape is sandwiched between an end frame and a holding plate, the holding surfaces of the end frame and the holding plate extend axially in opposite directions to each other and each of the holding surfaces is tapered axially to expand straight toward the opposing holding surface. Accordingly, the bearing holding structure may be easily formed with simpler shape of the holding surfaces.

11 Claims, 3 Drawing Sheets

BEARING HOLDING STRUCTURE AND MOTOR HAVING SAME

CROSS REFERENCE TO RELATED APPLICATION

This application is based upon and claims the benefit of priority of Japanese Patent Application No. 2000-47862 filed on Feb. 24, 2000, the content of which is incorporated herein by reference.

BACKGROUND OF THE INVENTION

1. Field of the Invention

The present invention relates to a bearing holding structure and a motor having the same.

2. Description of Related Art

Conventionally, as shown in FIG. 4, a motor 11 has a cylindrical yoke housing 12 with a bottom, a plurality of magnets 13 fixed to an inner surface of the yoke housing 12, a rotor 14 disposed in a space of the yoke housing 12 on an inner side of the magnets 13 and an end frame 15 fitted to an opening 12a of the yoke housing 12.

The end frame 15 is provided in a center thereof with an axially outward protruding cylindrical portion 15a. The cylindrical portion 15a is provided in a center thereof with an axially outward further protruding bearing holding portion 15b having a bottom. A through hole 15c, into which a rotor shaft 14a of the rotor 14 is inserted, is formed in a bottom center of the bearing holding portion 15b. A disk shaped holding plate 16 is fitted to the cylindrical portion. The holding plate 16 is provided in a center thereof with an axially inward protruding cylindrical bearing holding portion 16a.

A metal bearing 17, which holds rotatably the rotor shaft 14a, is held by the bearing holding portions 15 and 16. An outer circumfential surface 17a of the metal bearing 17 is formed in a spherical shape. Respective holding surfaces 15d and 16b of the bearing holding portions 15b and 16a are formed in combination thereof in a spherical shape corresponding to that of the outer circumfential surface 17a. The metal bearing 17 is sandwiched between and held by the end frame 15 and the holding plate 16 without moving axially and circumferentially in a state that the outer circumferential surface 17a is in an intimate contact with the holding surfaces 15d and 16b.

However, it is difficult and expensive in manufacturing to form in the end frame 15 and the holding plate 16 the spherical holding surfaces 15d and 16b whose each curvature is equal to that of the outer circumferential surface 17a of the bearing 17.

Further, as the conventional motor has a structure that the holding plate 16 is fitted into the cylindrical portion 15a of the end frame 15, the holding plate 16 and the cylindrical portion 15a are required to be formed with high dimensional accuracy for an axial alignment of the same, resulting in higher manufacturing cost.

SUMMARY OF THE INVENTION

An object of the invention is to provide a structure for holding a bearing whose outer circumferential surface is formed in a spherical shape by sandwiching the bearing between two separate holding surfaces whose each shape is simpler and may be manufactured at a lower cost.

It is another aspect of the invention to provide a structure for holding the bearing between the holding surfaces which may be coaxially placed on the bearing without forming the same with higher dimensional accuracy so far.

Another object of the invention to provide a motor having the bearing holding structure mentioned above.

To achieve the above objects, in a bearing holding structure in which a bearing whose outer circumferential surface is formed in a spherical shape is sandwiched between first and second members, the holding surfaces extend axially in opposite directions to each other and each of the holding surfaces is tapered axially to expand straight toward the opposing holding surface.

Further, the first and second members have fixing surfaces which extend radially from the holding surfaces, respectively. The fixing surfaces allow a radial and relative movement for adjusting an axial alignment among the first and second members and the bearing, when the fixing surfaces come in contact with each other in advance for sandwiching the bearing between the holding surfaces. After adjusting the alignment, the fixing surfaces are fixed to each other to inhibit the radial and relative movement so that the first and second members rigidly hold the bearing.

To provide the fixing surfaces simply, it is preferable that one of the fixing surfaces is provided with at least a projection and another of the fixing surfaces is provided with at least an aperture. The projection may be engaged with the aperture so as to be able to slightly move therein, when the fixing surfaces come in contact with each other in advance. After adjusting the axial alignment, the projection is deformed partly so that the fixing surfaces are fixed to each other.

Further, to prevent the bearing sandwiched between the holding surfaces from coming loose, preferably, at least one of the holding surfaces is provided with biasing means for urging the bearing against the opposing holding surface.

The biasing means is, preferably, a plurality of elastically deformable pieces formed circumferentially by cutting and rising at given angular intervals a part of the first and second members corresponding to the one of the holding surfaces.

BRIEF DESCRIPTION OF THE DRAWING other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
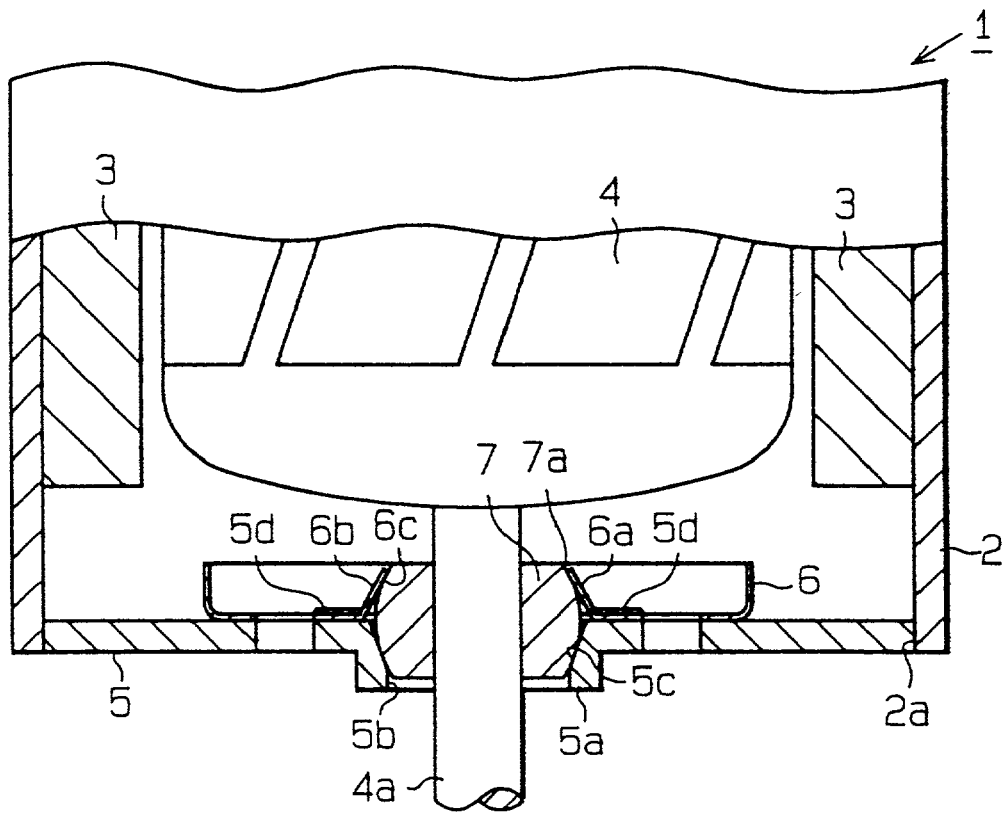
FIG. 1 is a cross sectional view showing a bearing holding structure of a motor according to an embodiment of the present invention.

A motor having a bearing holding structure according to an embodiment is described with reference to FIGS. 1 to 4. As shown in FIG. 1, a motor 1 has a cylindrical yoke housing 2 with a bottom, a plurality of magnets 3 fixed to an inner surface of the yoke housing 2, a rotor 4 disposed in a space of the yoke housing 2 on an inner side of the magnets 3 and an end frame 5 fitted to an opening 2a of the yoke housing 2.

Figure 2:
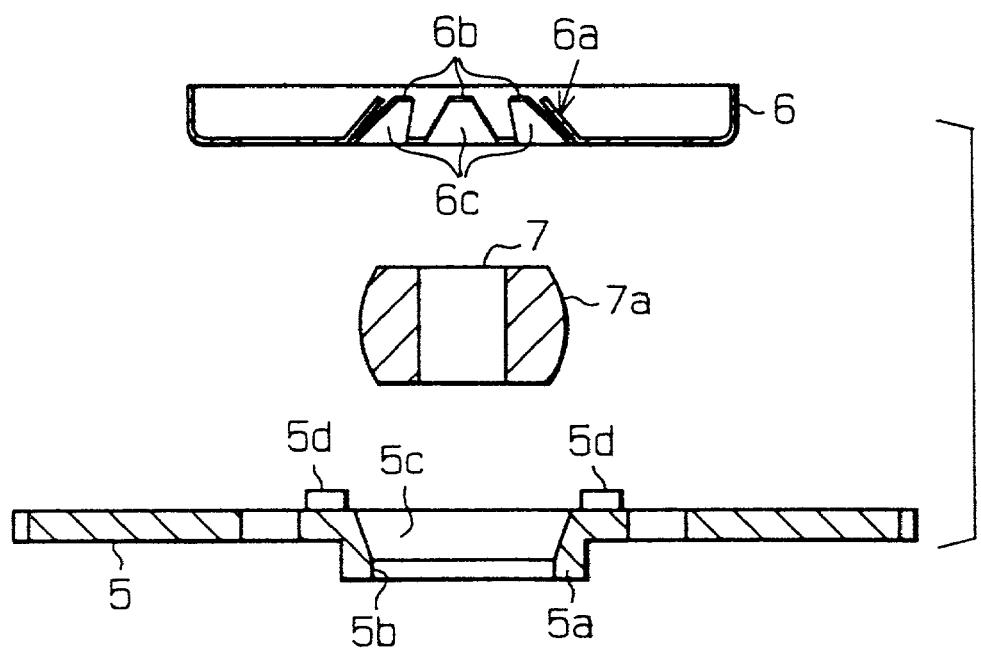
FIG. 2 is an exploded plan view of the bearing holding structure of FIG. 1.
Figure 3:
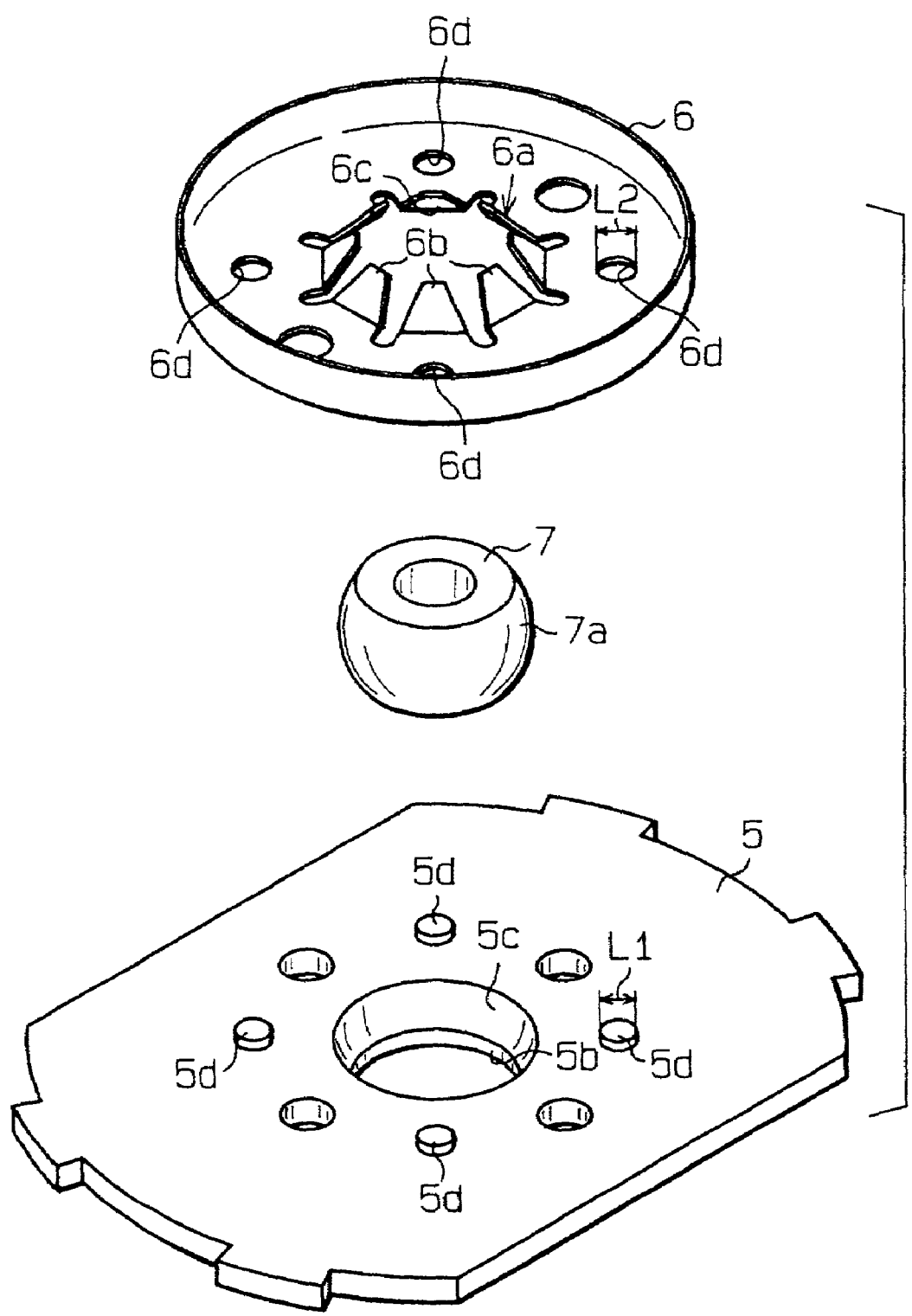
FIG. 3 is an exploded perspective views of the bearing holding structure of FIG. 1.
Figure 4:
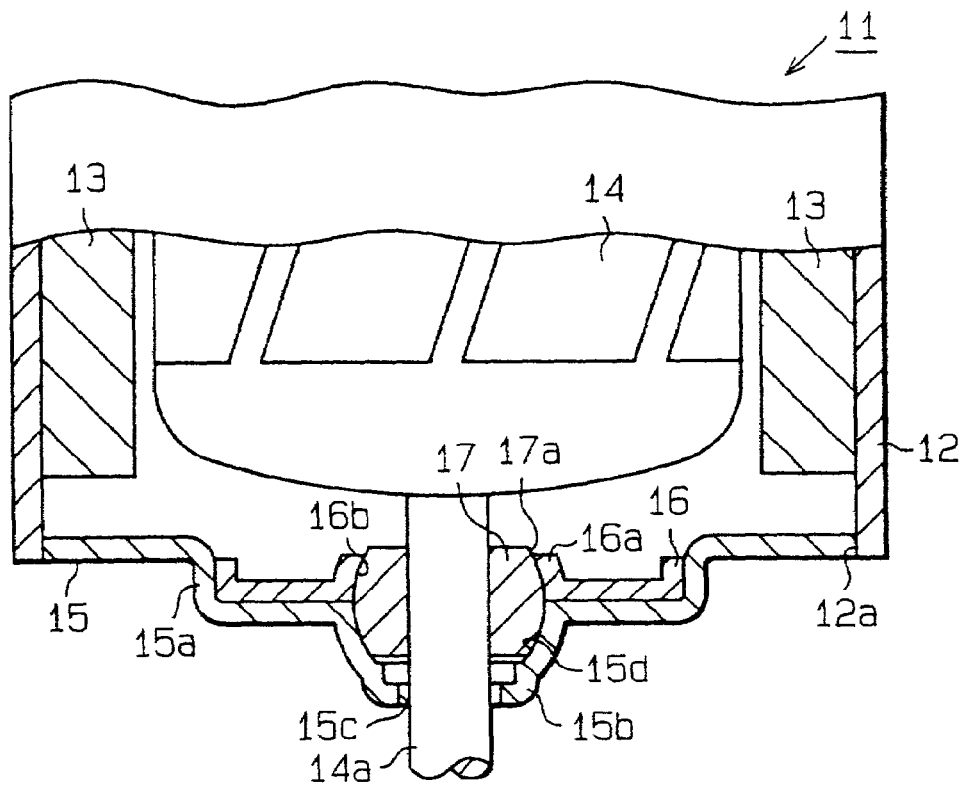
FIG. 4 is across sectional view showing a conventional bearing holding structure of a motor as a prior art.
Figure 5:
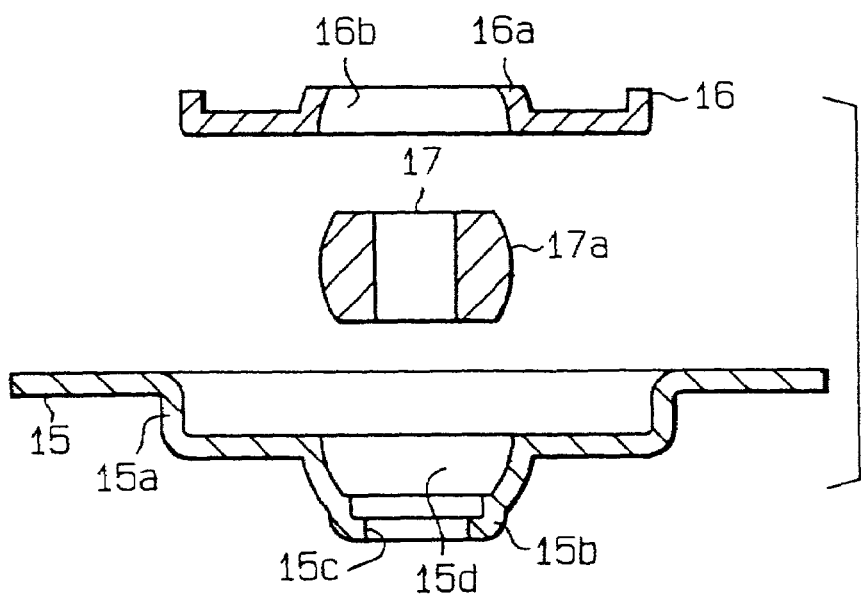
FIG. 5 is an exploded plan view of the bearing holding structure of FIG. 4.

As shown in FIGS. 2 and 3, the end frame 5 is provided in a center thereof with an axially outward protruding cylindrical bearing holding portion 5a. The holding portion 5a is provided in a center thereof with a through hole 5b into which a rotor shaft 4a of the rotor 4 is inserted. A holding surface 5c is formed axially in an inner wall of the through-hole 5b and is tapered straight axially so as to expand inward. That is, the holding surface 5c is formed in a taper shape whose cross section is linearly enlarged axially toward the bottom of the yoke housing 2. As shown in FIG. 3, the end frame 5 is further provided on an inside surface thereof with 4 pieces of engaging projections 5d protruding axially and inward so as to surround the through-hole 5b with a radial and outward space therefrom at constant angular intervals.

A disk-like holding plate 6 is fixed to the inner surface of the end frame 5. The disk-like holding plate 6 is provided with a bearing holding portion 6a constituted by 8 elastically deformable holding pieces which are formed in a near triangle shape by cutting radially at given angular intervals and raising flatly and inwardly a center portion thereof. An inner surface of the bearing holding portion 6a (each holding piece), which is opposed to the holding surface 5c, constitutes a holding surface 6c. The holding surface 6c is tapered straight axially to expand outward. That is, the holding surface 6c is formed in a taper shape whose cross section is enlarged linearly toward the holding surface 6c.

Further, as shown in FIG. 3, the holding plate 6a is provided at positions corresponding to the engaging projections 5d on an outer circumferential side of the bearing holding portion 6a with engaging apertures 6d whose each inner diameter L2 is larger that each outer diameter L1 of the engaging projections 5d. The projections 5d are slightly movable in the apertures 6a. Accordingly, when the end plate 6 comes in contact with the end frame 5, while the bearing is sandwiched therebetween, the holding plate is radially movable relative to the end frame 5.

The bearing holding portions 5a and 6a of the end frame 5 and holding plate 6 hold the metal bearing 7 whose outer circumferential surface 7a is shaped spherical and which rotatably holds the rotor shaft 4a. That is, the metal bearing 7 is sandwiched between the end frame 5 and the holding plate 6 in a state that the outer circumferential surface 7a is in an intimate contact with the holding surfaces 5c and 6c.

As the holding plate 6 is radially movable relative to the end frame 5, the plate 6 is moved radially to adjust an axial alignment of the bearing holding portions 5a and 6a. Then, the engaging projections 5d of the end frame 5 are partly deformed so that the holding plate 6 is fixed to the end frame 5 to hold the bearing 7 not to move axially and circumferentially.

Further, since the holding pieces 6b are elastic, the holding pieces urge the bearing against the end frame 5 so that the bearing 7 is firmly held by the holding surfaces 5c and 6c without being loosed therein.

In the embodiment mentioned above, the holding surface 6c is not limited to the holding pieces 6b formed by cutting and raising a part of the holding plate 6. The shape of the holding surface 6c may be any other shape or configuration, as far as it has a taper shaped holding surface. Further, the holding surface 5c of the end frame 5 may have the same construction as the holding surface 6c. The holding surfaces 5c and 6c may have identical constructions.

Furthermore, a method of fixing the holding plate 6 to the end frame 5 is not limited to the method that the engaging projections 5d are engaged with the engaging apertures 6d to be able to move therein in advance and, then, the projections 5d are deformed partly after having secured the axial alignment of the end frame 5 and the holding plate 6, as far as the end frame 5 and the holding plate 6 are fixed so as to secure the axial alignment thereof. Moreover, the bearing holding structure mentioned above is applicable not only to the motor but also to the other devices.

What is claimed is:

1. A bearing holding structure comprising:
   a bearing whose outer circumferential surface is formed in a spherical shape;
   first and second members having holding surfaces which extend axially in opposite directions to each other and between which the bearing is sandwiched, each of the holding surfaces being tapered axially to expand straight toward the opposing holding surface, wherein the first and second members have fixing surfaces which extend radially from the holding surfaces, respectively;
   a fastening structure on each of the fixing surfaces, wherein the fastening structures allow radial and relative movement of at least one of the first and second members with respect to the other of the first and second members prior to fastening the fastening structures for adjusting an axial alignment among the first and second members and the bearing, when the fixing surfaces come in contact with each other for sandwiching the bearing between the holding surfaces, and wherein the fixing surfaces are fixed to each other by deforming at least one of the fastening structure after the alignment to inhibit the radial and relative movement so that first and second members rigidly hold the bearing.

2. A bearing holding structure according to claim 1, wherein the fastening structures include at least a projection on one of the fixing surfaces and at least an aperture on the other of the fixing surfaces, the projection being engaged with the aperture so as to be able to slightly move therein, when the fixing surfaces come in contact with each other in advance, and, then, being deformed partly after having secured the axial alignment so that the fixing surfaces are fixed to each other.

3. A bearing holding structure according to claim 1, wherein at least one of the holding surfaces is provided with biasing means for urging the bearing against the opposing holding surface.

4. A bearing holding structure according to claim 3, wherein the biasing means is a plurality of elastically deformable pieces formed circumferentially by cutting radially at given angular intervals and raising in one direction a part of the first and second members corresponding to the one of the holding surfaces.

5. A motor comprising:
   a cylinder-shaped yoke having an opening at an axial end thereof;
   a plurality of magnets fixed to an inner circumference of the yoke;
   a rotor disposed in a space of the yoke on an inner side of the magnets;
   an end plate fixed to the opening, the end plate having an axially outwardly extending holding surface;
   a bearing disposed in a center of the end plate for rotatably holding the rotor, wherein an outer circumferential surface of the bearing is spherical;

a holding plate having axially inwardly extending holding surface, wherein the holding surfaces of the end plate and the holding plate are opposed to each other so that the bearing is sandwiched between the end plate and the holding plate, and each of the holding surfaces is tapered axially to expand straight toward the opposing holding surface, wherein the end and holding plates have fixing surfaces which extend radially from the holding surfaces, respectively; and a fastening structure on each of the fixing surfaces, wherein the fastening structures allow radial and relative movement of at least one of the first and second members with respect to the other of the first and second members prior to fastening the fastening structures to adjust an axial alignment among the end and holding plates and the bearing, when the fixing surfaces come in contact with each other for sandwiching the bearing between the holding surfaces and, then, are fixed to each other by deforming at least one of the fastening structure after the alignment to inhibit the radial and relative movement so that the end and holding plates hold the bearing.

6. A motor according to claim 5, wherein one of the fixing surfaces is provided with at least a projection and another of the fixing surfaces is provided with at least an aperture, the projection being engaged with the aperture so as to be able to slightly move therein, when the fixing surfaces come in contact with each other in advance, and, then, is partly deformed after having secured the axial alignment so that the fixing surfaces are fixed to each other.

7. A method of holding a bearing that is self aligning, the method comprising:

providing a first member and a second member having holding surfaces, which extend axially in opposite directions to each other, each of the holding surfaces being tapered axially to expand straight toward the opposing holding surface; and sandwiching the bearing between the holding surfaces of the first member and the second member, wherein the first member and second member further have fixing surfaces which extend radially from the holding surfaces moving the first member and the second member toward each other until the fixing surfaces come in contact with each other, thereby performing the sandwiching, and allowing a radial and relative movement of the first member and the second member with a fastener structure formed on each of the first and second fixing surfaces for adjusting axial alignment of the first member and the second member and the beating, when the fixing surfaces come in contact with each other and after the allowing a radial and relative movement of at least one of the first and the second members with respect to the other of the first and second members, fixing the first member and the second member to each other by deforming at least one of the fastener structures to inhibit the radial and relative movement so that first and second members rigidly hold the bearing in alignment.

8. The method of holding a bearing of claim 7 further including providing one of the fixing surfaces with at least a projection and another of the fixing surfaces with at least an aperture to serve as the fastening structures, the projection being engaged with the aperture so as to be able to move therein when the fixing surfaces come in contact with each other, thereby providing for the adjusting the axial alignment among the first member and the second member and the bearing.

9. The method of holding a bearing of claim 8 further including deforming the projection to secure the fixing surfaces to each other thus securing the axial alignment among the first member and the second member and the bearing.

10. The method of holding a bearing of claim 7 further including providing at least one of the holding surfaces with biasing means for urging the bearing against the opposing holding surface.

11. The method of holding a bearing of claim 10, wherein the providing at least one of the holding surfaces with biasing means further includes providing the biasing means as a plurality of elastically deformable pieces formed circumferentially by cutting radially at given angular intervals and raising in one direction a part of the first and second members corresponding to the one of the holding surfaces.

* * * * *